Figure 3:
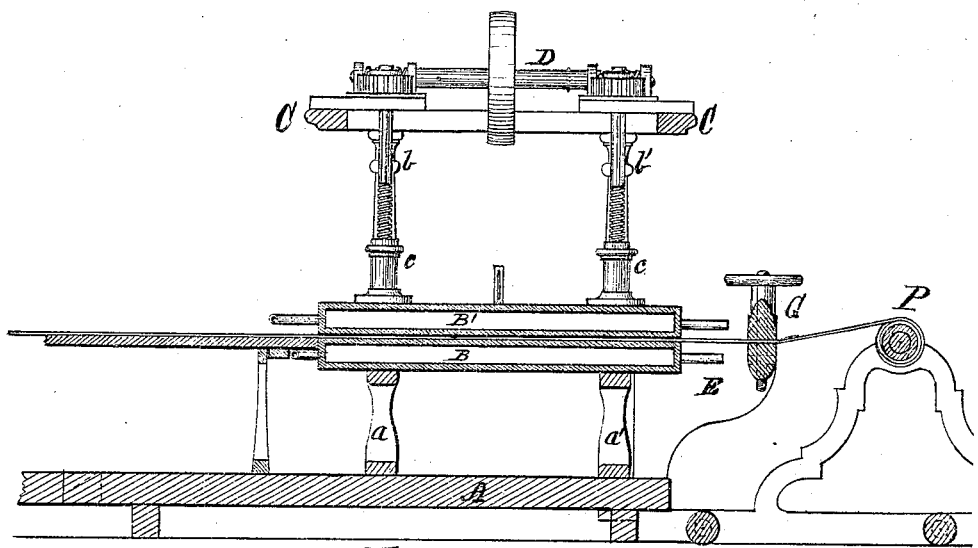

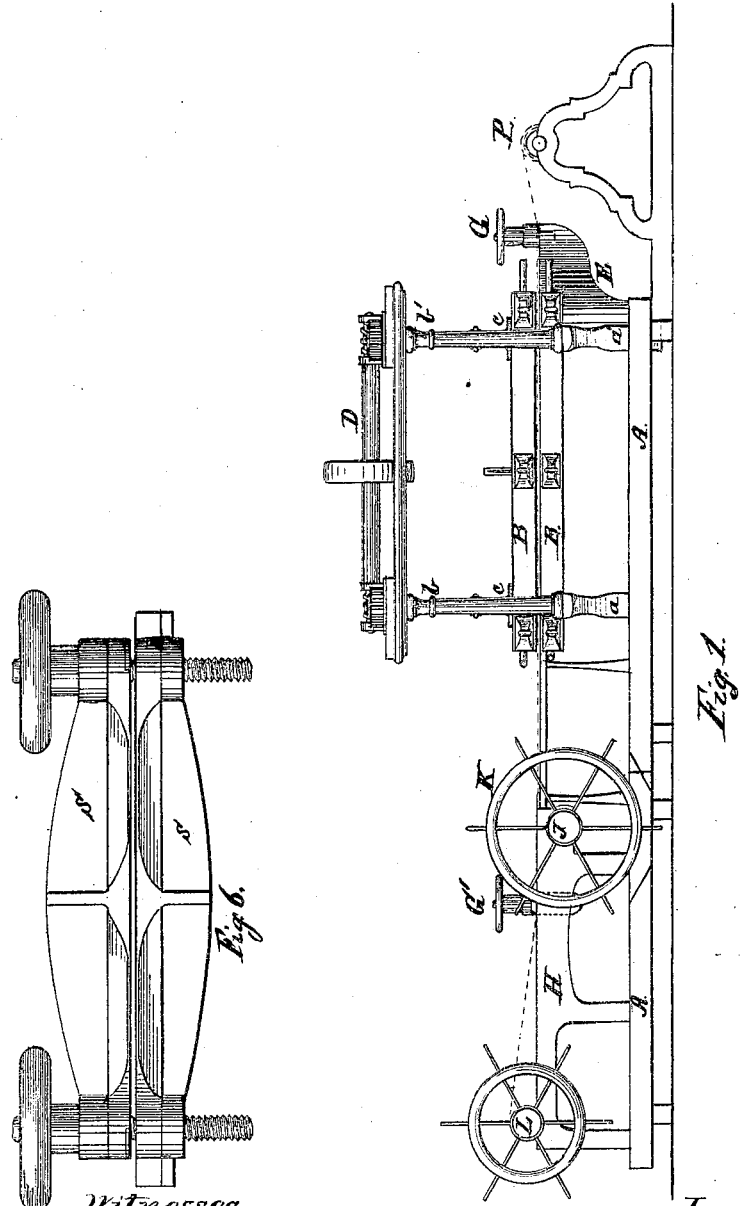

3 Sheets--Sheet 2.

D. C. GATELY & J. B. FORSYTH.
Apparatus for the Manufacture of Vulcanized Rubber Belting.

No. 141,433.  Patented August 5, 1873.

Witnesses.
Fred'c Howes
Jarvis Blume

Inventors.
Dennis C. Gately
James B. Forsyth
by J. E. Maynadier

3 Sheets--Sheet 3.

D. C. GATELY & J. B. FORSYTH.
Apparatus for the Manufacture of Vulcanized Rubber Belting.

No. 141,433.  
Patented August 5, 1873.

UNITED STATES PATENT OFFICE.

DENNIS C. GATELY, OF NEWTOWN, CONNECTICUT, AND JAMES B. FORSYTH, OF BOSTON, MASSACHUSETTS.

IMPROVEMENT IN APPARATUS FOR THE MANUFACTURE OF VULCANIZED-RUBBER BELTING.

Specification forming part of Letters Patent No. 141,433, dated August 5, 1873; application filed December 2, 1872.

*To all whom it may concern:*

Be it known that we, DENNIS C. GATELY, of Newtown, in the State of Connecticut, and JAMES B. FORSYTH, of Boston, in the State of Massachusetts, have invented an Apparatus for Heating and Stretching Rubber Belting and similar articles, of which the following is a specification:

Our invention consists in combining a proper stretching apparatus with an apparatus substantially like that described and shown in the reissued patent granted to James S. Carew, as assignee of the executor of Daniel Hayward, numbered 3,531, and dated July 6, 1869.

Such a stretching apparatus is shown in combination with Hayward's contrivance in the drawings, where—

Figure 2:
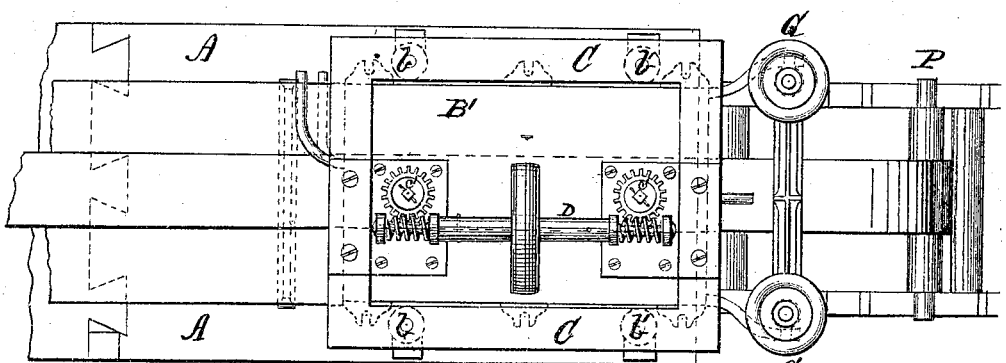
Figure 4:
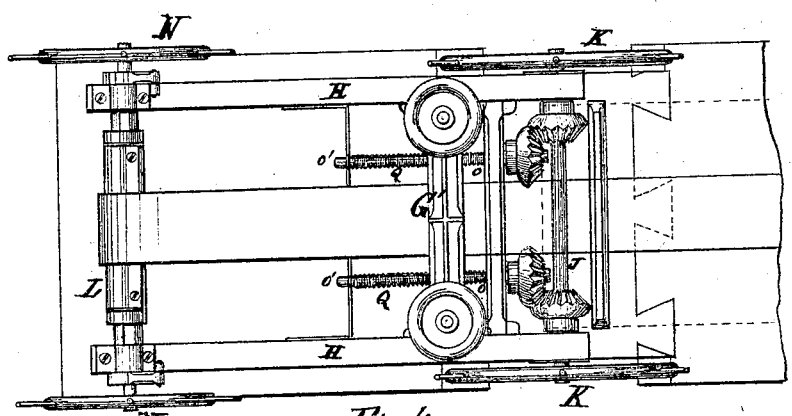

Figure 1 is a side elevation of an apparatus embracing our invention. Fig. 2 is a plan of a portion of said apparatus, and Fig. 3 is a sectional elevation of the same. Fig. 4 is a plan of the remaining portion of said apparatus, Fig. 5 being a corresponding sectional elevation. Fig. 6 is a detailed view of a clamp upon an enlarged scale.

We proceed to give a brief description of Hayward's apparatus as adapted to vulcanizing or finishing rubber belting, and as we have employed it in combination with a stretching apparatus.

A is a platform supporting the heating apparatus, and also the stretching apparatus. B B' are two steam-chambers, between which the belting lies while subjected to heat. The chamber B rests upon two cross-bars, which connect the uprights $a\ a$ with $a'\ a'$, as shown. Immediately above the uprights $a\ a\ a'\ a'$ are four posts, $b\ b\ b'\ b'$, supporting a frame-work, C. The upper steam-chamber B' is supported from the frame C, and operated, as shown, by means of two female screws, $c$, secured to its upper surface, and two upright shafts, $c'$, having male screws working into the female screws. Upon the upper ends of the shafts $c'\ c'$, above the frame C, are fixed worm-gears $d$, to which motion is communicated by worms on the driving-shaft D, which has bearings in the frame C. Steam enters the chambers B and B' through pipes, which are shown, the pipes connecting with the chamber B', having flexible joints.

The mode of operation of the above-described heating apparatus is well known. We proceed with a description of the stretching apparatus which we have combined therewith in carrying out our invention.

Figure 5:
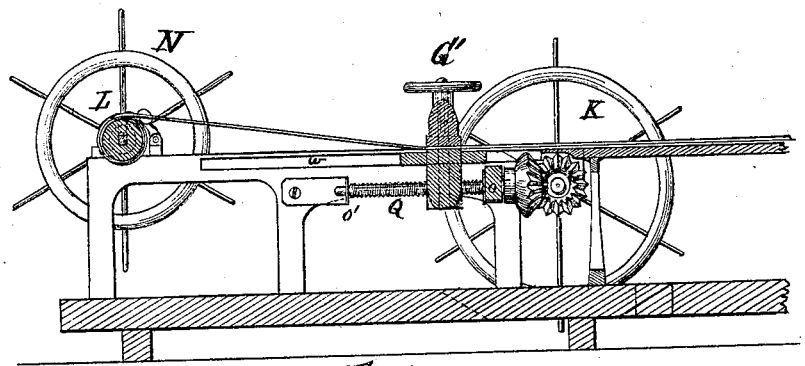

E is a bracket at one end of the heating apparatus, supporting a clamp, G, as shown. At the other end, fixed upon the platform A, is a frame-work, H, which supports a second clamp, G'. The clamp G is fixed in its position, having only its own opening and shutting movement, while the clamp G' has a movement to and from the heating apparatus. Otherwise the two clamps are substantially alike. Each clamp has two flat plates, $s\ s$, (see Fig. 6, which is a representation of clamp G,) between which plates the belting is held, the upper plate in each clamp being raised from or screwed down upon the other, as shown in Fig. 6. The outer ends of the lower plate of the clamp G' rest and slide back and forth in ways W in the frame-work H, motion being imparted by two screws upon shafts Q Q, having bearings, as shown in Fig. 4, at $o\ o$ and $o'\ o'$, and working through female screws in a bar attached to the lower plate of the clamp. The two screws are revolved by a windlass, K, upon the shaft J, by means of bevel-gearing, as shown in Figs. 4 and 5. This movement of the clamp G' stretches the belting, as hereinafter described. L is a shaft, upon which the finished belting is rolled up. It is operated by a windlass, N. P is a roller, situated as shown, from which belting is fed forward to our improved apparatus.

The combined apparatus described above is operated as follows: A sufficient length of belting is unrolled from the roller P, the advancing end being passed through the clamp G and between the steam-chambers B B', and drawn till it reaches the clamp G', when both clamps are tightened. The belting is then allowed to rest until the portion between the steam-chambers is sufficiently heated, when the windlasses K are turned, causing the clamp G' to travel away from the other clamp, and thus stretching the belting. After the belting is properly stretched the steam-chamber B' may be brought down upon the upper surface of the belting below it and the stretched portion of the belting further finished, according to the invention of Hayward, described in the reissued patent to which reference has been made. The advancing end of the belting—the clamps being loosened—is then drawn forward and secured to the roller L, when so much of the belting is wound upon the shaft L, by turning the windlass N, as will bring a new length of belting between the chambers B and B' to be finished.

As above described, one length of the belting would not be properly treated, but this difficulty may be remedied by attaching to the roller L a permanent belt as a part of the apparatus, which shall have some proper device for seizing upon the forward end of the belting operated upon, the office of this permanent belt being afterward performed by the finished part of the belting undergoing treatment.

A corresponding permanent belt may be attached to the roller P.

It is obvious that the clamp G' might be dispensed with and the belting properly stretched by winding it up upon the roller L.

The advantages of our apparatus are that the belting is uniformly and quickly heated, as the plates or steam-chambers can be adjusted for any thickness of goods; and also that the stretching and plating or pressing process can both be carried on at the same time. The goods may also be originally vulcanized between the steam-chambers, if desired; but in practice we vulcanize them first in the common steam-chamber, unless the belts be very thick and wide.

We make no claim for an apparatus for heating the belting; nor do we make a broad claim for an apparatus for heating and stretching the belting; but—

What we do claim is—

The combination of a stretching apparatus, substantially such as described, with the two steam-chambers B B', the whole constructed and operated substantially as described.

DENNIS C. GATELY.
JAMES B. FORSYTH.

Witnesses:
J. E. MAYNADIER,
JAS. M. BLACKMAN.